United States Patent
Takagi

(10) Patent No.: US 10,273,909 B2
(45) Date of Patent: Apr. 30, 2019

(54) CATALYTIC CONVERTER

(71) Applicant: Futaba Industrial Co., Ltd., Aichi (JP)

(72) Inventor: Katsuhisa Takagi, Aichi (JP)

(73) Assignee: Futaba Industrial Co., Ltd., Aichi (JP)

( * ) Notice: Subject to any disclaimer, the term of this patent is extended or adjusted under 35 U.S.C. 154(b) by 170 days.

(21) Appl. No.: 15/103,353

(22) PCT Filed: Dec. 9, 2014

(86) PCT No.: PCT/JP2014/082576
§ 371 (c)(1),
(2) Date: Jun. 10, 2016

(87) PCT Pub. No.: WO2015/087882
PCT Pub. Date: Jun. 18, 2015

(65) Prior Publication Data
US 2016/0333828 A1 Nov. 17, 2016

(30) Foreign Application Priority Data
Dec. 13, 2013 (JP) .................................. 2013-258604

(51) Int. Cl.
*F01N 13/08* (2010.01)
*F01N 3/10* (2006.01)
*F02M 26/12* (2016.01)
*F02M 26/15* (2016.01)
(Continued)

(52) U.S. Cl.
CPC .............. *F02M 26/15* (2016.02); *F01N 3/106* (2013.01); *F01N 3/28* (2013.01); *F01N 3/2807* (2013.01);
(Continued)

(58) Field of Classification Search
CPC ............ F01N 13/1838; F01N 13/1877; F01N 13/1872; F01N 2470/00; F01N 2470/14;
(Continued)

(56) References Cited

U.S. PATENT DOCUMENTS

| 8,984,864 B2 * | 3/2015 | Cockle ............... B01D 53/9445 60/276 |
| 2001/0008616 A1 * | 7/2001 | Haga .................. B01D 53/9454 422/234 |
| 2002/0053343 A1 | 5/2002 | Sato et al. |

FOREIGN PATENT DOCUMENTS

| CN | 1502801 A | 6/2004 | |
| EP | 1422412 A2 * | 5/2004 | ............. F02M 26/12 |

(Continued)

OTHER PUBLICATIONS

International Search Report (Form PCT/ISA/210) dated Mar. 17, 2015, for corresponding patent application No. PCT/JP2014/082576.
(Continued)

*Primary Examiner* — Audrey K Bradley
*Assistant Examiner* — Dapinder Singh
(74) *Attorney, Agent, or Firm* — Renner, Otto, Boisselle & Sklar, LLP

(57) ABSTRACT

Provided is a catalytic converter to be disposed in a branch portion between an exhaust gas passage that guides exhaust gas from an internal combustion engine to outside and an exhaust gas recirculation passage that recirculates a portion of the exhaust gas from the exhaust gas passage to an intake system of the internal combustion engine. The catalytic converter comprises a catalyst storage case that stores a catalyst, a recirculation pipe that forms the exhaust gas recirculation passage, an abutment portion that makes the catalyst storage case and the recirculation pipe be in surface contact with each other and be arranged in parallel to each other, and a downstream cone that makes the exhaust gas passage and the exhaust gas recirculation passage merge with each other.

12 Claims, 6 Drawing Sheets

(51) Int. Cl.
    *F01N 13/18* (2010.01)
    *F01N 3/28* (2006.01)
(52) U.S. Cl.
    CPC .......... *F01N 13/08* (2013.01); *F01N 13/1838* (2013.01); *F01N 13/1844* (2013.01); *F01N 13/1872* (2013.01); *F01N 13/1877* (2013.01); *F02M 26/12* (2016.02); *F01N 2470/00* (2013.01); *F01N 2470/14* (2013.01); *Y02A 50/2322* (2018.01)
(58) Field of Classification Search
    CPC .......... F01N 3/106; F01N 3/2807; F01N 3/28; F02M 26/12; F02M 26/15; Y02A 50/2322
    See application file for complete search history.

(56) References Cited

FOREIGN PATENT DOCUMENTS

| | | |
|---|---|---|
| JP | 2002-147288 A | 5/2002 |
| JP | 2004-176554 A | 6/2004 |
| JP | 2012-031782 A | 2/2012 |
| JP | 2013-136989 A | 7/2013 |

OTHER PUBLICATIONS

Notice of Reason(s) for Rejection for corresponding Japanese Patent Application No. 2013-258604 dated Jun. 27, 2017 (with English language translation).
Notice of Reason(s) for Rejection dated Jan. 9, 2018 for corresponding Japanese Patent Application No. 2013-258604 (with English language translation).
Notice of Reason(s) for Rejection dated Dec. 26, 2017 for corresponding Chinese Patent Application No. 201480067591.2 (with English language translation).
International Preliminary Report in corresponding PCT Application No. PCT/JP2014/082576, including Notification of Transmittal of Translation of IPRP dated Jun. 23, 2016 (form PCT/IB/338), IPRP (form PCT/IB/373), and Written Opinion of the ISA (form PCT/ISA/237), eight pages.

* cited by examiner

CATALYTIC CONVERTER

CROSS-REFERENCE TO RELATED APPLICATIONS

This application is a national phase of International Application No. PCT/JP2014/082576 filed Dec. 9, 2014, which claims the benefit of Japanese Patent Application No 2013-258604 filed Dec. 13, 2013 in the Japan Patent Office. The entire disclosures of International Application No. PCT/JP/2014/082576 and Japanese Patent Application No. 2013-258604 are incorporated herein by reference.

TECHNICAL FIELD

The present invention relates to a catalytic converter.

BACKGROUND ART

A vehicle comprises an exhaust gas passage for discharging exhaust gas, which has been discharged from a combustion chamber of an engine, to the outside. In the exhaust gas passage, a catalytic converter comprising a catalyst for purifying exhaust gas is provided.

Additionally, for the purpose of reduction of nitrogen oxide contained in the exhaust gas, etc., the vehicle comprises an exhaust gas recirculation passage configured such that the exhaust gas, which has been discharged into the exhaust gas passage from the combustion chamber, are sent to an air intake passage thereby to introduce the exhaust gas into the combustion chamber.

The exhaust gas to be introduced into the air intake passage by the aforementioned exhaust gas recirculation passage is has passed through the catalyst provided in the catalytic converter disposed in the exhaust gas passage.

As shown in FIG. 6, a conventional catalytic converter 100 comprises a case 103 for housing a catalyst, and a downstream cone 106 disposed downstream of the case 103. Connected to the downstream cone 106 is an EGR pipe 107, which forms an exhaust gas recirculation passage.

The EGR pipe 107 is provided in a standing manner from an outer surface of the downstream cone 106 and bent toward an air intake passage.

SUMMARY OF THE INVENTION

Problems to be Solved by the Invention

For the purpose of improving excellent fuel efficiency, catalysts with a large diameter have been more and more used in vehicles; in the meantime, downsizing of vehicles has been desired.

In order to connect an EGR pipe to a catalytic converter in a conventional manner, however, it is necessary to have a large space between the catalytic converter and various devices adjacent to the catalytic converter.

In addition to the large-diameter catalysts, such a large space between the aforementioned various devices and the catalytic converter is necessary; this may inhibit the downsizing. If this is the case, it is difficult to satisfy both needs for downsizing of a vehicle and for improving the excellent fuel efficiency.

It is desired to provide a catalytic converter that does not require a large space around the catalytic converter when an EGR pipe is connected to the catalytic converter.

Means for Solving the Problems

In one aspect of the present invention, a catalytic converter to be disposed in a branch portion between an exhaust gas passage that guides exhaust gas from an internal combustion engine to outside and an exhaust gas recirculation passage that recirculates a portion of the exhaust gas from the exhaust gas passage to an intake system of the internal combustion engine, the catalytic converter comprising: a catalyst storage case that is made of a heat-resistance material and that stores a catalyst disposed on the exhaust gas passage; a recirculation pipe that is made of a heat-resistance material and that forms the exhaust gas recirculation passage; an abutment portion provided in a vicinity of an end part of at least one of the catalyst storage case and the recirculation pipe, the vicinity being at a specified distance apart from the end part of the at least one of the catalyst storage case and the recirculation pipe, the abutment portion being configured to make the catalyst storage case and the recirculation pipe be in surface contact with each other and be arranged in parallel to each other; and a downstream cone comprising one opening and the other opening, the one opening being formed such that the catalyst storage case and the recirculation pipe, which abut each other with the abutment portion, are insertable into the one opening, the other opening being open on a downstream side of the exhaust gas passage, the downstream cone being configured to make the exhaust gas passage and the exhaust gas recirculation passage merge with each other.

In this catalytic converter, the abutment portion is configured to make the part of the exhaust-gas recirculation pipe where the abutment portion is provided and the catalyst storage case be arranged in parallel to each other. Therefore, a required space around the catalytic converter to dispose the exhaust-gas recirculation pipe can be minimized.

Accordingly, use of the catalytic converter of the present invention does not require a large space around the catalytic converter and therefore, improvement of excellent fuel efficiency and downsizing of a vehicle can be both achieved.

In the catalytic converter in one aspect of the present invention, a lower-side inner wall surface of the downstream cone may be formed at least such that in a case where the catalyst storage case is disposed having a specified placement angle and the recirculation pipe is disposed below the catalyst storage case, a liquid can flow to a downstream side of the exhaust gas passage.

If there is a recess, or the like in the downstream side of a catalyst, into which moisture can accumulate, moisture including chlorine, etc., contained in exhaust gas may accumulate; this moisture is the cause of corrosion in the downstream cone. In addition, when this moisture evaporates and enters into a recirculation pipe, unwanted water may accumulate in a part inside the recirculation pipe where moisture tends to accumulate; in this case, the recirculation pipe may be corroded.

According to one aspect of the present invention, in a case where the catalyst storage case is disposed having the specified placement angle and the recirculation pipe is disposed below the catalyst storage case, water can flow to the downstream side of the exhaust gas passage by the downstream cone; therefore, corrosion of the downstream cone and/or the recirculation pipe can be inhibited.

Since an arrangement relationship between the catalyst storage case and the recirculation pipe varies in many ways depending on vehicles, it is preferable that regardless of any variations of the arrangement relationship, water flows to the downstream side of the exhaust gas passage.

In the catalytic converter in one aspect of the present invention, the lower-side inner wall surface of the downstream cone may be formed such that, in a case where the catalyst storage case is disposed having the specified placement angle, when the recirculation pipe is disposed at any position around an axis of the catalyst storage case, a liquid can flow to the downstream side of the exhaust gas passage.

In the above-described configuration, corrosion of the downstream cone, etc. can be inhibited even if the recirculation pipe is disposed in any direction 360° around the catalyst storage case.

The abutment portion may be provided in the vicinity of the end part of the recirculation pipe; the vicinity may be at the specified distance apart from the end part of the recirculation pipe, and the abutment portion may have a shape along an outer peripheral side surface of the catalyst storage case.

Any material that is capable of forming the exhaust gas passage, etc. may be used as the heat-resistance material; however, in view of processability, etc., stainless steel may be preferred.

BRIEF DESCRIPTION OF THE DRAWINGS

FIGS. 2A to 2C are illustrative views each showing the catalytic converter of the present embodiment, in which FIG. 2A is a front view of the catalytic converter, FIG. 2B is a cross sectional view thereof taken along IIB-IIB (here, only a downstream cone is shown), and FIG. 2C is a cross sectional view thereof taken along IIB-IIB (here, a catalyst is not shown).

FIGS. 3A and 3B are illustrative views each showing a modified example of the catalytic converter of the present embodiment, in which FIG. 3A is a perspective view and FIG. 3B is a front view thereof.

FIGS. 4A and 4B are illustrative views each showing a modified example of the catalytic converter of the present embodiment, in which FIG. 4A is a perspective view and FIG. 4B is a front view thereof.

FIGS. 5A and 5B are illustrative views each showing a modified example of the catalytic converter of the present embodiment, in which FIG. 5A is a perspective view and FIG. 5B is a front view thereof.

EXPLANATION OF REFERENCE NUMERALS

1 . . . catalytic converter, 2 . . . outer-part forming member, 3 . . . case (catalyst storage case), 4 . . . upstream cone, 5 . . . upstream pipe, 6 . . . downstream cone, 6a . . . large-diameter opening (one opening), 6b . . . small-diameter opening (the other opening), 7 . . . EGR pipe (recirculation pipe), 30 . . . opening, 40 . . . central part, 41 . . . first insertion part, 42 . . . second insertion part, 50 . . . pipe body, 51 . . . upstream-side flange, 60 . . . cone body, 61 . . . downstream-side flange, 70 . . . abutment portion, 70a . . . opening, 71 . . . EGR flange

MODE FOR CARRYING OUT THE INVENTION

Hereinafter, embodiments of the present invention will be described with reference to the drawings.

In a vehicle in which a catalytic converter 1 of the present embodiment is to be installed, an exhaust gas passage and an exhaust gas recirculation passage are provided; the exhaust gas passage is for guiding exhaust gas from an internal combustion engine to the outside; and the exhaust gas recirculation passage is for recirculating a portion of the exhaust gas from the exhaust gas passage to an intake system of the internal combustion engine.

The catalytic converter 1 of the present embodiment is disposed in the exhaust gas passage at a branch portion branching off from the exhaust gas recirculation passage.

Figure 1:
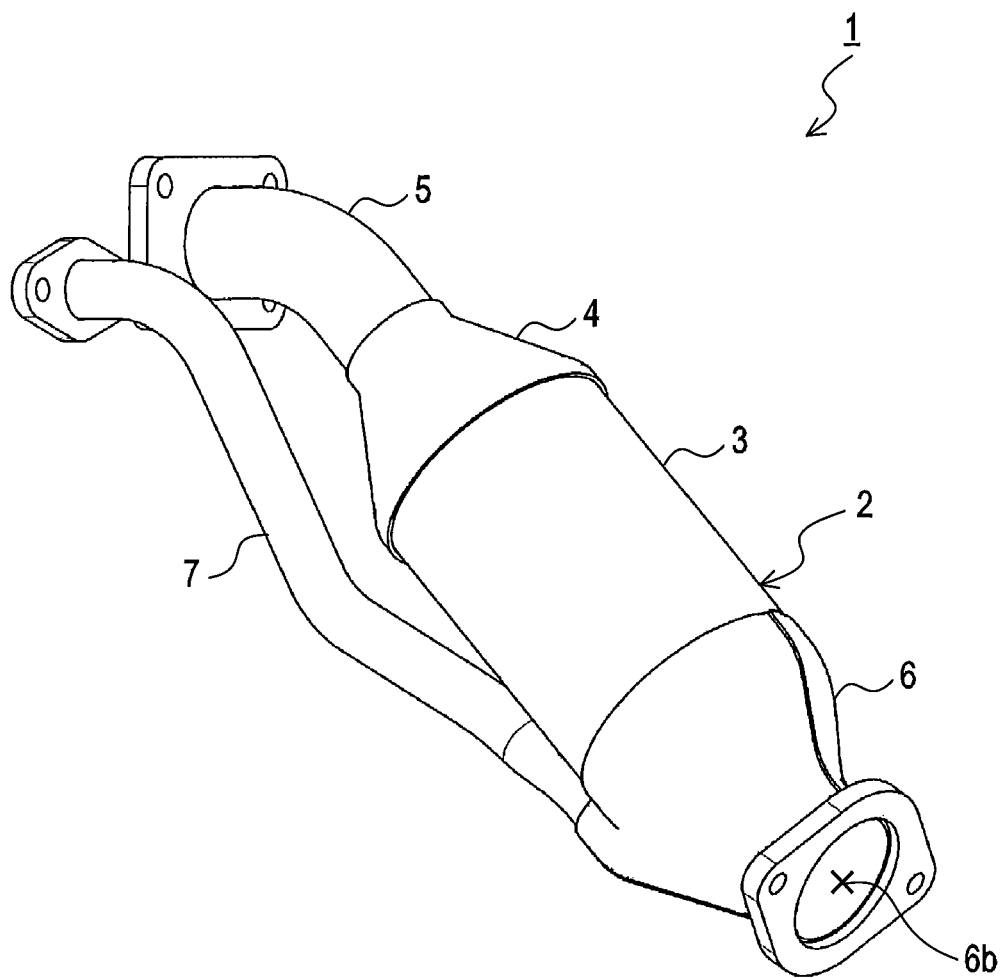
FIG. 1 is a perspective view of a catalytic converter of the present embodiment.

The catalytic converter 1 comprises a honeycomb oxidation catalyst, which is not shown. Also, the catalytic converter 1 comprises an outer-part forming member 2, as shown in FIG. 1.

The outer-part forming member 2 is made of stainless steel, which is a heat-resistant material.

The outer-part forming member 2 comprises a case 3 for housing the oxidation catalyst, an upstream cone 4, an upstream pipe 5, a downstream cone 6, and an EGR pipe 7.

The case 3 is formed in a cylindrical shape. Inside the case 3, the oxidation catalyst (not shown) formed in a columnar shape is stored coaxially with a longitudinal axis of the case 3.

Figure 2A:
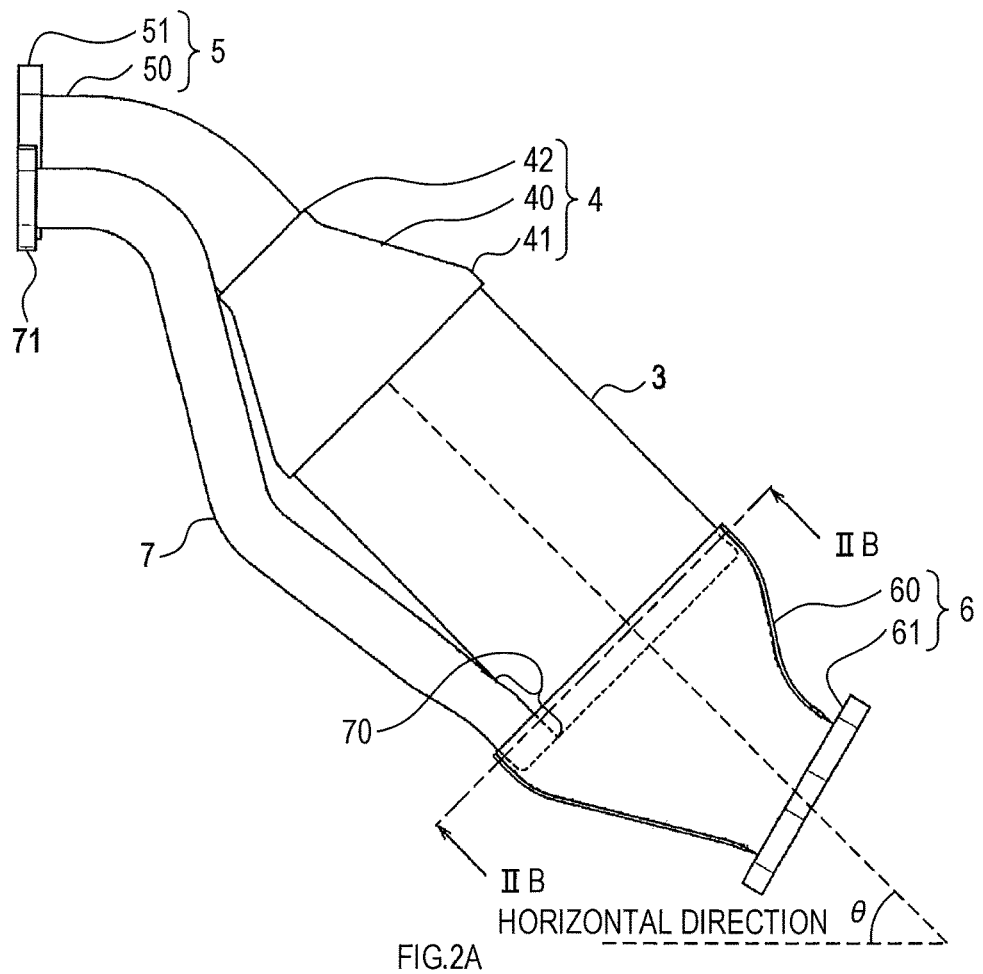
Figure 2B:
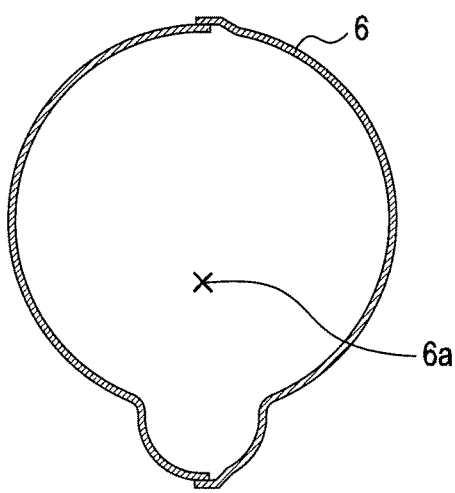

As shown in FIG. 2A, the upstream cone 4 has a central part 40. The central part 40 is formed in a circular truncated cone shape. In the central part 40, both axial ends of the central part 40 are open. On a side where the central part 40 has a large opening diameter, a first insertion part 41 is provided; the first insertion part 41 is formed in a generally cylindrical shape with substantially the same diameter as a diameter of the large opening diameter. On a side where the central part 40 has a small opening diameter, a second insertion part 42 is provided; the second insertion part 42 is formed in a generally cylindrical shape with substantially the same diameter as a diameter of the small opening diameter.

The case 3 is fittingly inserted into the upstream cone 4 at the large opening diameter side thereof, and such an inserted portion is welded. As a result of this, the upstream cone 4 and the case 3 are fixed together.

The upstream pipe 5 comprises a pipe body 50 and an upstream-side flange 51. The pipe body 50 guides exhaust gas discharged from an engine, to the case 3. The upstream-side flange 51 is an end portion of the pipe body 50 and is provided at the other end opposite to one end of the pipe body 50 to be inserted into the upstream cone 4.

The upstream pipe 5 is fixed to an upstream-side exhaust gas system via the upstream-side flange 51.

The aforementioned one end of the upstream pipe 5 is fittingly inserted into the upstream cone 4 at the small opening diameter side thereof, and such an inserted portion is welded. As a result of this, the upstream pipe 5 and the upstream cone 4 are fixed together.

As shown in FIG. 2A, the downstream cone 6 comprises a cone body 60 and a downstream-side flange 61.

The cone body 60 comprises a large-diameter opening 6a and a small-diameter opening 6b (see FIG. 1) that has a smaller diameter than the large-diameter opening 6a. The large-diameter opening 6a is formed such that the case 3 and the EGR pipe 7 are overlapped with each other and inserted into the large-diameter opening 6a.

The cone body 60 is formed to have a shape with a diameter that gradually decreases from the large-diameter opening 6a to the small-diameter opening 6b.

The downstream-side flange 61 is provided, among ends of the downstream cone 6, at the end where the small-diameter opening 6b is provided.

The downstream cone 6 is fixed to a downstream-side exhaust gas system via the downstream-side flange 61.

The case 3 and the EGR pipe 7 are fittingly inserted into the large-diameter opening 6a, and the inserted portions are welded, thereby fixing the downstream cone 6 to the case 3 and the EGR pipe 7.

The downstream cone 6 is formed such that, in a case where the case 3 is disposed at a specified placement angle θ with respect to the horizontal direction as shown in FIG. 2A, even if the EGR pipe 7 is arranged at any position around an axis of the case 3, an angle of a lower-side inner wall surface of the downstream cone 6, into the large-diameter opening 6a of which the case 3 and the EGR pipe 7 are inserted, forms an angle that allows water to flow to the downstream side of the exhaust gas passage.

The downstream cone 6 is thin-walled and thus, an outer surface and an inner surface thereof are generally similar in shapes.

Figure 2C:
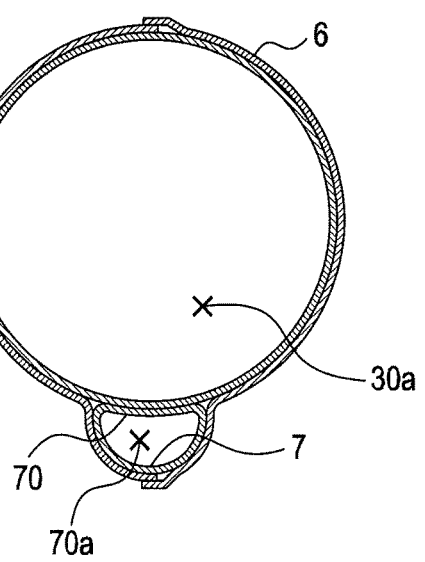

As shown in FIGS. 2A and 2C, the EGR pipe 7 comprises an abutment portion 70 formed in the vicinity of one end of the EGR pipe 7, the vicinity being at a specified distance apart from the one end; the abutment portion 70 has a shape along an outer peripheral side surface of the case 3.

The end of the EGR pipe 7 is provided with the aforementioned abutment portion 70 and therefore, the end of the EGR pipe 7 has an opening 70a that is a generally D-letter shaped opening, as shown in FIG. 2C. With this abutment portion 70, the end of the EGR pipe 7 is in surface contact with an outer circumferential surface of the case 3.

Moreover, the EGR pipe 7 comprises an EGR flange 71 at the other end thereof.

The EGR pipe 7 is fixed to a device located in the downstream side of the exhaust gas recirculation passage, via the EGR flange 71.

In order to mount the case 3 and the EGR pipe 7 to the downstream cone 6, firstly, the EGR pipe 7 is disposed such that the abutment portion 70 comes in surface contact with the outer circumferential surface of the case 3.

Then, the case 3 and the EGR pipe 7 are aligned such that the end of the EGR pipe 7 where the abutment portion 70 is provided is flush with a downstream side end of the case 3 so as to make the opening 70a of the EGR pipe 7 and an opening 30a located at the downstream side of the case 3 (on the downstream side of the exhaust gas passage) be open on the same plane.

The case 3 and the EGR pipe 7 are overlapped with each other and inserted into the large-diameter opening 6a of the downstream cone 6 and then, the case 3 and the EGR pipe 7 are welded and fixed to the downstream cone 6.

In the catalytic converter 1 of the present embodiment, when assembled, the upstream pipe 5, the upstream cone 4, the case 3, and the downstream cone 6 form a part of the exhaust gas passage; the EGR pipe 7 forms a part of the exhaust gas recirculation passage.

Moreover, by fittingly inserting the case 3 and the EGR pipe 7 into the large-diameter opening 6a of the downstream cone 6, the exhaust gas passage and the exhaust gas recirculation passage merge with each other inside the downstream cone 6.

When exhaust gas flows from a side where the engine is located (i.e., the upstream side), the majority of the exhaust gas flows through the upstream pipe 5, the upstream cone 4, the case 3, and the downstream cone 6, and then into a further downstream side of the exhaust gas passage, while a portion of the exhaust gas flows from the downstream cone 6 via the EGR pipe 7 to the downstream side of the exhaust gas recirculation passage.

(Characteristic Operation and Effect of the Present Embodiment)

In the catalytic converter 1 of the present embodiment, by the presence of the abutment portion 70 (see FIG. 2A), a part of the EGR pipe 7 where the abutment portion 70 is provided and the case 3 are arranged in parallel to each other; therefore, it is possible to minimize a space required around the catalytic converter 1 to arrange the EGR pipe 7.

Accordingly, when the catalytic converter 1 of the present embodiment is used, it is unnecessary to secure a large space around the catalytic converter 1; therefore, improvement of excellent fuel efficiency and downsizing of a vehicle can be both achieved.

If there is a recess or the like in the downstream side of a catalyst, into which moisture can accumulate, moisture including chlorine, etc., contained in exhaust gas may accumulate; this moisture is the cause of corrosion in the downstream cone 6. Moreover, when this moisture evaporates and enters into a recirculation pipe downstream of the EGF pipe 7, unwanted water may accumulate in a part inside the recirculation pipe where moisture is likely to accumulate; in this case, the recirculation pipe may be corroded.

In this respect, the catalytic converter 1 of the present embodiment is configures such that, in a case where the case 3 is disposed at the specified placement angle θ, even if the EGR pipe 7 is disposed in any location 360° around the axis of the case 3, the lower-side inner wall surface of the downstream cone 6 allows a liquid to flow to the downstream side of the exhaust gas passage.

Accordingly, if the catalytic converter 1 of the present embodiment is used, in a case where the case 3 is disposed at the specified placement angle θ and the EGR pipe 7 is disposed below the case 3, the downstream cone 6 causes water to flow to the downstream side of the exhaust gas passage; thereby, corrosion of the downstream cone 6 and the EGR pipe 7 can be inhibited.

Other Embodiments

One example of the present embodiment has been described above; however, needless to say, the present invention is not limited to the above-described embodiment and can be carried out in various modes.

(1) The catalytic converter 1 described in the above-described embodiment is just one example, and should not be limited to this example.

Figure 3A:
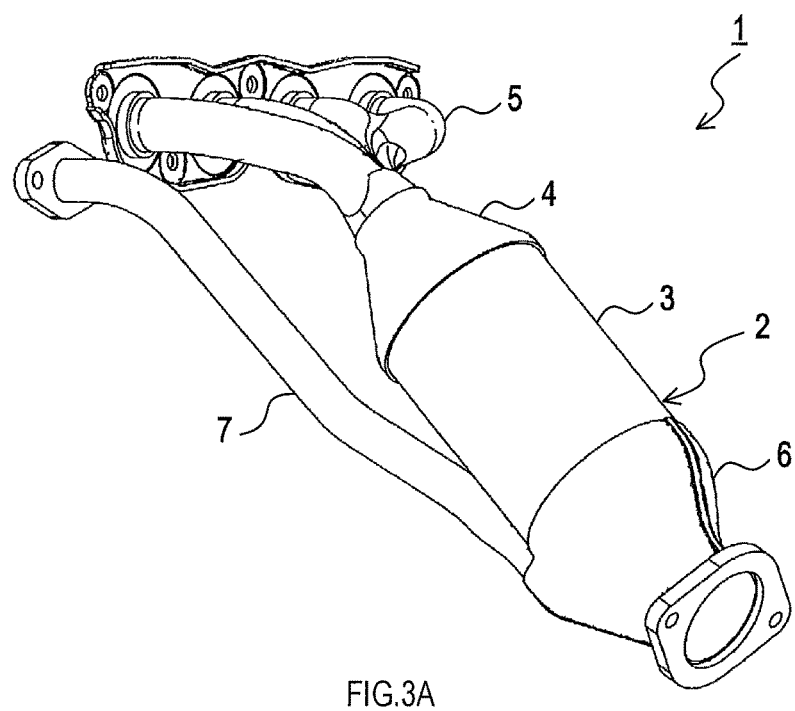
Figure 3B:
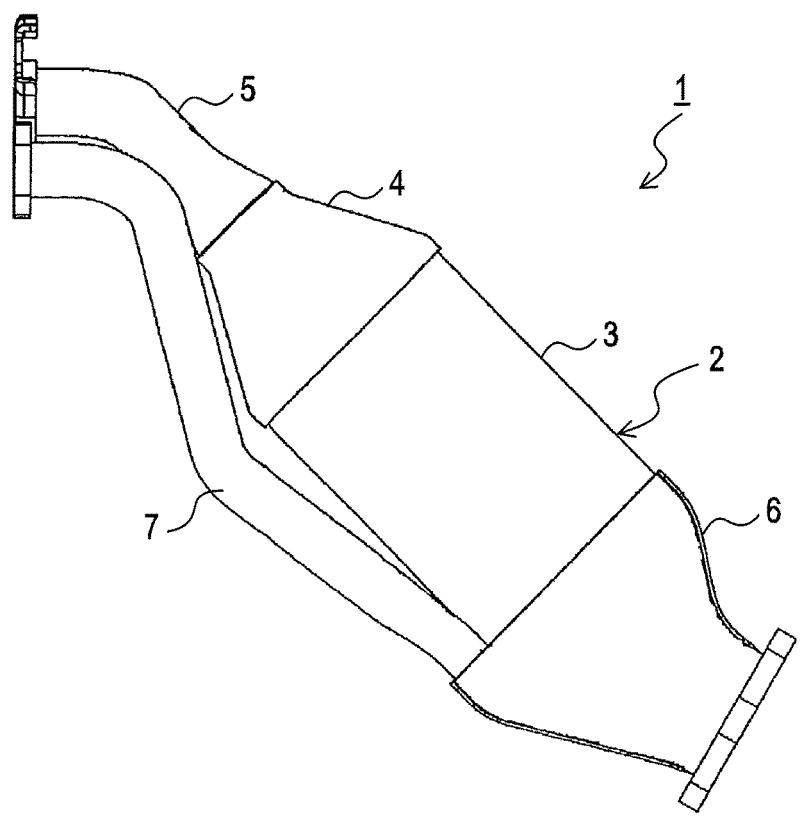
Figure 4A:
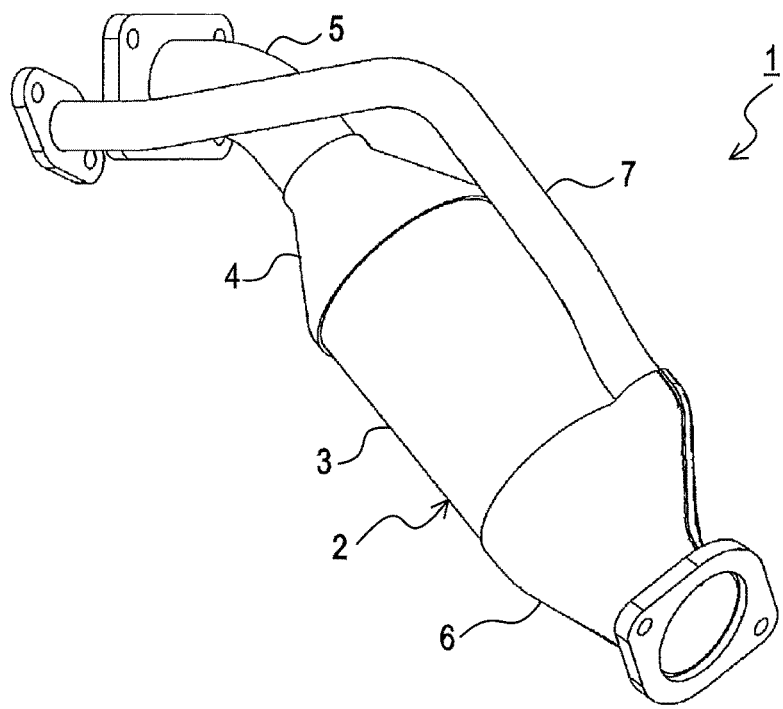
Figure 4B:
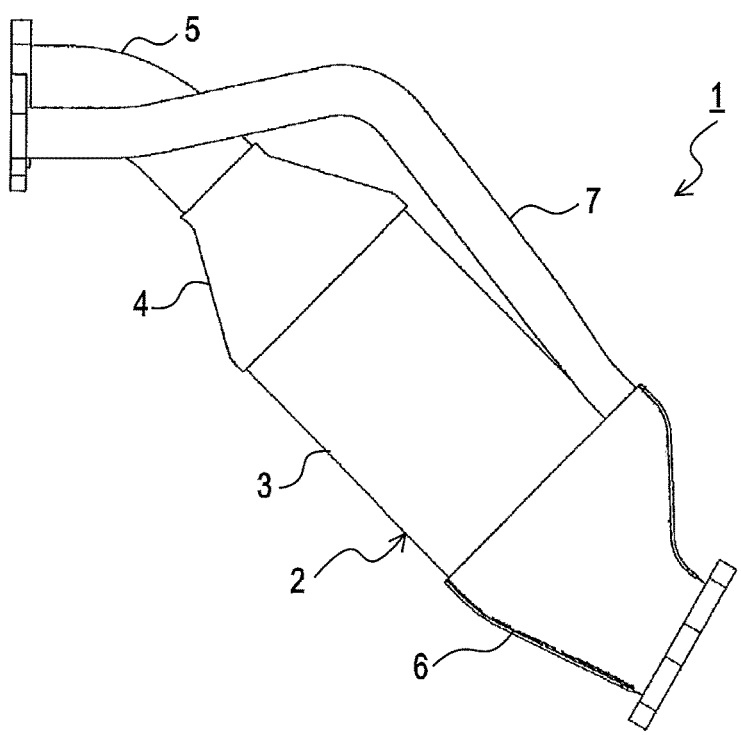
Figure 5A:
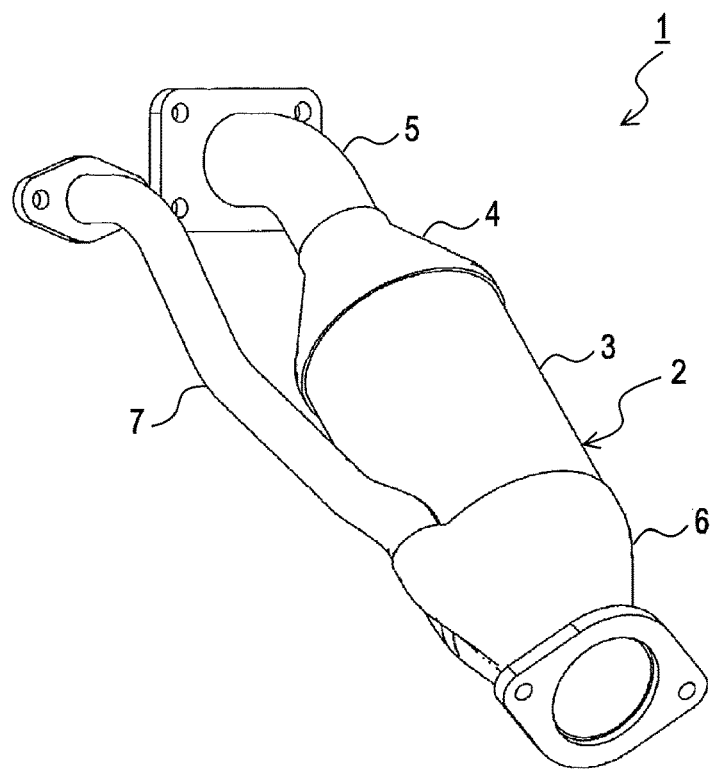
Figure 5B:
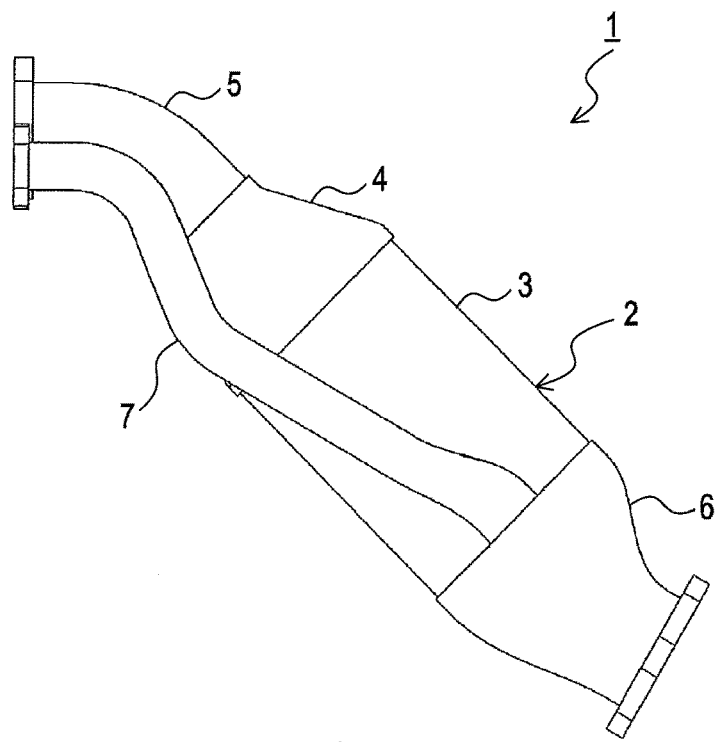
Figure 6:
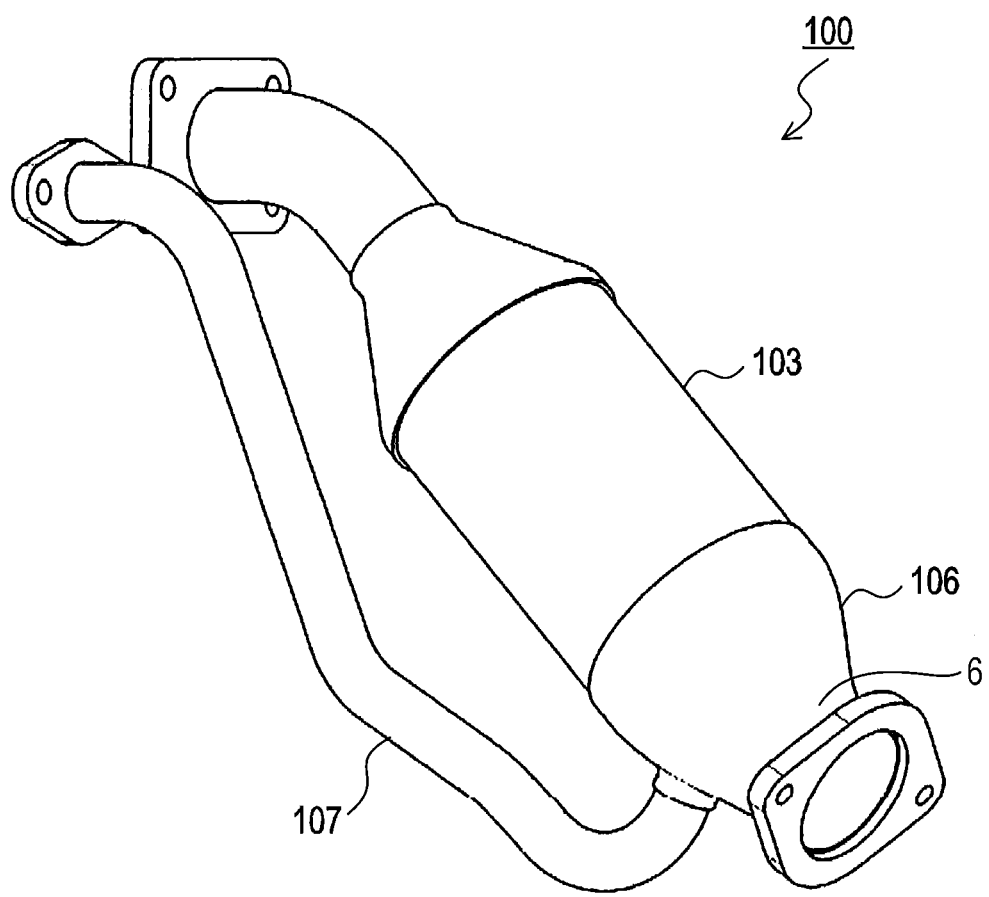
FIG. 6 is an illustrative view of a conventional catalytic converter.

(2) In the above-described embodiment, the upstream pipe 5 is configured to receive exhaust gas from one system; however, for example, as shown in FIGS. 3A and 3B, the upstream pipe 5 may be configured to receive exhaust gas from multiple systems (e.g., four systems).

(3) In the above-described embodiment, the downstream cone 6 is configured such that even if the EGR pipe 7 is located at any position around the case 3, moisture flows to the downstream side of the exhaust gas passage. However, the catalytic converter may be formed such that, only when the EGR pipe 7 is oriented in a specified direction with respect to the case 3, e.g., only when the EGR pipe 7 is located below the case 3, an inner surface (inner wall surface) of the downstream cone 6 causes water (liquid) to flow to the downstream side of the exhaust gas passage.

(4) In the above-described embodiment, a configuration in which the EGR pipe 7 is located below the case 3 is described; however, as shown in FIGS. 4A, 4B, 5A, and 5B, it may be possible to adopt a configuration in which the EGR pipe 7 is located on the left or right side of the case 3, or above the case 3.

(5) In the above-described embodiment, the abutment portion 70 is provided in the EGR pipe 7; however, the abutment portion may be provided in the case 3. Moreover, the abutment portion 70 is provided, in the EGR pipe 7, in the vicinity of the end having the opening 70a; however, the abutment portion 70 may be longer or shorter than that illustrated in the drawings.

(6) Each constituent element of the present invention is conceptual, and should not be limited to those in the above-described embodiments. For example, functions that one element has may be divided among a plurality of elements, or functions that a plurality of elements have may be integrated to one element. Moreover, at least part of the configuration of the above-described embodiments may be replaced with a known configuration having the same function. Furthermore, at least part of the configuration of the above-described embodiments may be added to, replaced with, etc., a configuration of the other above-described embodiments.

The invention claimed is:

1. A catalytic converter to be disposed in a branch portion between an exhaust gas passage that guides exhaust gas from an internal combustion engine to outside and an exhaust gas recirculation passage that recirculates a portion of exhaust gas from the exhaust gas passage to an intake system of the internal combustion engine, the catalytic converter comprising:
   a catalyst storage case that is made of a heat-resistance material and that stores a catalyst disposed on the exhaust gas passage;
   a recirculation pipe that is made of a heat-resistance material and that forms the exhaust gas recirculation passage;
   an abutment portion provided in respective end parts of the catalyst storage case and the recirculation pipe, the abutment portion being configured to make the catalyst storage case and the recirculation pipe be in surface contact with each other and be arranged in parallel to each other; and
   a downstream cone comprising one opening and an other opening,
      the one opening being formed such that the catalyst storage case and the recirculation pipe, which abut each other with the abutment portion, are insertable into the one opening, the other opening being open on a downstream side of the exhaust gas passage, the downstream cone being configured to make the exhaust gas passage and the exhaust gas recirculation passage merge with each other,
   wherein, with respect to a direction of the exhaust gas flowing through the catalyst storage case, in respective downstream portions of the recirculation pipe and the catalyst storage case, the recirculation pipe and the catalyst storage case are inserted in the one opening of the downstream cone,
   wherein an outer surface of the recirculation pipe and an outer surface of the catalyst storage case abut with each other at the abutment portion,
   wherein the recirculation pipe and the catalyst storage case are contained in the downstream cone,
   wherein the recirculation pipe and the catalyst storage case do not share a wall, and
   wherein the abutment portion is located only in a downstream end of the recirculation pipe with respect to the direction of the exhaust gas flowing through the catalyst storage case.

2. The catalytic converter according to claim 1, wherein the heat-resistance material is stainless steel.

3. The catalytic converter according to claim 1, wherein the abutment portion is provided in the end part of the recirculation pipe, and the abutment portion has a shape along an outer peripheral side surface of the catalyst storage case.

4. The catalytic converter according to claim 3, wherein the heat-resistance material is stainless steel.

5. The catalytic converter according to claim 1, wherein a lower-side inner wall surface of the downstream cone is formed at least such that in a case where the catalyst storage case is disposed having a specified placement angle and the recirculation pipe is disposed below the catalyst storage case, a liquid can flow to a downstream side of the exhaust gas passage.

6. The catalytic converter according to claim 5, wherein the heat-resistance material is stainless steel.

7. The catalytic converter according to claim 5, wherein the abutment portion is provided in the end part of the recirculation pipe, and the abutment portion has a shape along an outer peripheral side surface of the catalyst storage case.

8. The catalytic converter according to claim 7, wherein the heat-resistance material is stainless steel.

9. The catalytic converter according to claim 5, wherein the lower-side inner wall surface of the downstream cone is formed such that, in a case where the catalyst storage case is disposed having the specified placement angle, when the recirculation pipe is disposed at any position around an axis of the catalyst storage case, a liquid can flow to the downstream side of the exhaust gas passage.

10. The catalytic converter according to claim 9, wherein the heat-resistance material is stainless steel.

11. The catalytic converter according to claim 9, wherein the abutment portion is provided in the end part of the recirculation pipe, and the abutment portion has a shape along an outer peripheral side surface of the catalyst storage case.

12. The catalytic converter according to claim 11, wherein the heat-resistance material is stainless steel.

* * * * *